US010099669B2

(12) United States Patent
Hattori et al.

(10) Patent No.: US 10,099,669 B2
(45) Date of Patent: Oct. 16, 2018

(54) BRAKE CONTROL DEVICE

(71) Applicant: TOYOTA JIDOSHA KABUSHIKI KAISHA, Toyota-shi, Aichi (JP)

(72) Inventors: Tsutomu Hattori, Susono (JP); Akira Nagae, Susono (JP); Hiroshi Onuma, Suntou-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 9 days.

(21) Appl. No.: 15/310,229

(22) PCT Filed: Jun. 17, 2015

(86) PCT No.: PCT/JP2015/068111
§ 371 (c)(1),
(2) Date: Nov. 10, 2016

(87) PCT Pub. No.: WO2015/194680
PCT Pub. Date: Dec. 23, 2015

(65) Prior Publication Data
US 2017/0144640 A1    May 25, 2017

(30) Foreign Application Priority Data
Jun. 17, 2014    (JP) .................................. 2014-124804

(51) Int. Cl.
*B60T 8/1755*    (2006.01)
*B60T 7/22*    (2006.01)
(Continued)

(52) U.S. Cl.
CPC ............ *B60T 8/17558* (2013.01); *B60T 7/22* (2013.01); *B60T 11/323* (2013.01); *B60T 11/34* (2013.01);
(Continued)

(58) Field of Classification Search
CPC ........ B60T 7/22; B60T 8/17558; B60T 17/22; B60T 17/221; B60T 17/226; B60T 17/227; B60T 2201/024; B60T 2270/403
See application file for complete search history.

(56) References Cited

U.S. PATENT DOCUMENTS 6,105,705 A *  8/2000  Faye ...................... B60T 7/12
                                                    180/275
8,930,060 B1 *  1/2015  Lu ...................... G05D 1/0214
                                                    340/438
(Continued)

FOREIGN PATENT DOCUMENTS

JP    H06-312654 A    11/1994
JP    2002145046 A  *  5/2002
(Continued)

OTHER PUBLICATIONS

JPO machine translation of JP 2002-145046 (original JP document published May 22, 2002 (Year: 2002).*

*Primary Examiner* — Behrang Badii
*Assistant Examiner* — David A Testardi
(74) *Attorney, Agent, or Firm* — Oliff PLC

(57) ABSTRACT

A brake control device includes: a liquid pressure line provided for each vehicle wheel and supplied with a brake liquid pressure; a pressurization unit configured to supply a pressurization brake liquid pressure to the liquid pressure line; an abnormality detection unit configured to detect an abnormality of the liquid pressure line at a time the brake liquid pressure of the liquid pressure line is not greater than a threshold value; and a pressurization adjustment unit configured to continuously supply the pressurization brake liquid pressure to the liquid pressure line of the normal vehicle wheel having a low abnormality occurrence risk and suppress the supply pressure of the pressurization brake liquid pressure to the liquid pressure line of the vehicle (Continued)

wheel having a high abnormality occurrence risk until the abnormality of the liquid pressure line is detected by the abnormality detection unit.

6 Claims, 6 Drawing Sheets

(51) Int. Cl.
    *B60T 17/22*     (2006.01)
    *B60T 11/32*     (2006.01)
    *B60T 11/34*     (2006.01)
    *B60T 13/14*     (2006.01)
    *B60T 17/02*     (2006.01)

(52) U.S. Cl.
    CPC ............ *B60T 13/145* (2013.01); *B60T 17/02* (2013.01); *B60T 17/22* (2013.01); *B60T 17/226* (2013.01); *B60T 2201/024* (2013.01); *B60T 2260/02* (2013.01); *B60T 2270/403* (2013.01); *B60T 2270/88* (2013.01)

(56) References Cited

U.S. PATENT DOCUMENTS

| | | | | |
|---|---|---|---|---|
| 2003/0106732 | A1* | 6/2003 | Watanabe | B60T 7/22 180/169 |
| 2009/0038873 | A1* | 2/2009 | Lucas | B60R 21/0134 180/275 |
| 2009/0210114 | A1* | 8/2009 | Baumann | B60R 21/0132 701/45 |
| 2010/0004815 | A1* | 1/2010 | Ewerhart | B60T 8/17558 701/33.4 |
| 2010/0300794 | A1* | 12/2010 | Stabrey | B60T 7/22 180/275 |
| 2011/0140508 | A1* | 6/2011 | Cetinkaya | B60T 13/662 303/6.01 |
| 2011/0264347 | A1* | 10/2011 | Cetinkaya | B60T 7/22 701/70 |
| 2011/0264348 | A1* | 10/2011 | Cetinkaya | B60T 7/22 701/70 |
| 2012/0004819 | A1* | 1/2012 | Lu | B60T 7/22 701/70 |
| 2012/0046843 | A1* | 2/2012 | Cetinkaya | B60T 7/12 701/70 |
| 2012/0283927 | A1* | 11/2012 | Reinisch | B60T 7/22 701/70 |
| 2013/0241275 | A1* | 9/2013 | Miyazaki | B60T 8/4081 303/6.01 |
| 2013/0253792 | A1* | 9/2013 | Hammoud | B60T 7/22 701/70 |
| 2016/0137177 | A1* | 5/2016 | Wilhelm | B60T 7/22 701/70 |

FOREIGN PATENT DOCUMENTS

| | | | |
|---|---|---|---|
| JP | 2007145313 A | * | 6/2007 |
| JP | 2010058711 A | * | 3/2010 |
| JP | 2010152656 A | * | 7/2010 |
| WO | WO-2013/150631 A1 | * | 10/2013 |

* cited by examiner

BRAKE CONTROL DEVICE

TECHNICAL FIELD

The present invention relates to a brake control device that controls a braking force generated in a vehicle.

BACKGROUND ART

Hitherto, various brake control devices are known. For example, there is known a brake control device that performs a collision avoidance control (a so-called pre-collision brake control) by automatically generating a braking force in a manner such that a brake actuator of a brake system is pressurized when a possibility of a collision of an own vehicle is detected. Patent Literature 1 below discloses such a brake control device. When the risk of the collision is estimated, the brake control device performs a pre-collision brake control by outputting a closing signal to a depressurization valve and outputting a duty signal to a pressurization valve. Meanwhile, when the risk of the collision disappears, the brake control device stops the pre-collision brake control by outputting a close signal to the pressurization valve and outputting a duty signal to the depressurization valve.

CITATION LIST

Patent Literature

Patent Literature 1: Japanese Patent Application Laid-open No. 6-312654

DISCLOSURE OF INVENTION

Problems to be Solved by the Invention

Incidentally, in the brake system, a liquid pressure line may be damaged by the collision of the own vehicle. At that time, it is desirable to detect an abnormal decrease in the brake liquid pressure and specify a damaged position at an early timing. However, when the downstream side (the vehicle wheel side) of the brake actuator is damaged during the pressurization control, the brake liquid pressure at the damaged position gently decreases since the brake liquid pressure is continuously pressurized even at the damaged position, and hence there is a possibility that the detection of the abnormal decrease in the brake liquid pressure may be late.

Therefore, the invention is made to solve the above-described problems of the related art, and an object thereof is to provide a brake control device capable of promptly detecting an abnormality of a brake liquid pressure line.

Solutions to the Problems

A brake control device according to the present invention includes a liquid pressure line provided for each vehicle wheel and supplied with a brake liquid pressure; a braking force generation unit provided for each vehicle wheel and configured to generate a braking force in response to the brake liquid pressure supplied from each liquid pressure line; a pressurization unit configured to supply a pressurization brake liquid pressure to the liquid pressure line; an abnormality detection unit configured to detect an abnormality of the liquid pressure line at a time the brake liquid pressure of the liquid pressure line is not greater than a threshold value; a liquid pressure adjustment unit configured to interrupt the supply of the brake liquid pressure to the liquid pressure line of which the abnormality is detected; a collision possibility determination unit configured to determine a possibility of a collision between an own vehicle and an obstacle and determine whether the collision is avoidable; a drive assist control unit configured to perform a collision avoidance control by controlling the pressurization unit and supplying the pressurization brake liquid pressure to each liquid pressure line at a time the possibility of the collision between the own vehicle and the obstacle exists and the collision is not avoidable and perform a post-collision drive assist control by supplying the pressurization brake liquid pressure to the liquid pressure line of the vehicle wheel as a control target vehicle wheel after the collision; a collision part estimation unit configured to estimate a collision part, of the own vehicle, to collide with the obstacle; an abnormal part estimation unit configured to estimate the liquid pressure line of the vehicle wheel having a high occurrence risk of abnormality due to the collision based on estimation information of the collision part; and a pressurization adjustment unit configured to continuously supply the pressurization brake liquid pressure to the liquid pressure line of the normal vehicle wheel having a low abnormality occurrence risk and suppress the supply pressure of the pressurization brake liquid pressure to the liquid pressure line of the vehicle wheel having a high abnormality occurrence risk until the abnormality of the liquid pressure line is detected by the abnormality detection unit.

In the brake control device, it is preferable to include a collision determination unit configured to detect the collision between the own vehicle and the obstacle, wherein the pressurization adjustment unit suppresses the supply pressure of the pressurization brake liquid pressure to the liquid pressure line of the vehicle wheel having a high abnormality occurrence risk until the abnormality of the liquid pressure line is detected by the abnormality detection unit at least after the collision.

In the brake control device, it is preferable to include a collision determination unit configured to detect the collision between the own vehicle and the obstacle, wherein the pressurization adjustment unit suppresses the supply pressure of the pressurization brake liquid pressure to the liquid pressure line of the vehicle wheel having a high abnormality occurrence risk from at least before the collision until the abnormality of the liquid pressure line is detected by the abnormality detection unit after the collision.

In the brake control device, it is preferable that the pressurization adjustment unit suppresses the supply pressure of the pressurization brake liquid pressure to the liquid pressure line of the vehicle wheel having a high abnormality occurrence risk by decreasing the supply pressure of the pressurization brake liquid pressure compared to the liquid pressure line of the normal vehicle wheel having a low abnormality occurrence risk or interrupting the supply of the pressurization brake liquid pressure.

Effects of the Invention

When the collision may not be avoided, the brake control device according to the invention supplies the pressurization brake liquid pressure to the liquid pressure lines of all vehicle wheels and estimates the liquid pressure line of the vehicle wheel having a high occurrence risk of abnormality due to the collision based on the estimated collision part to collide with the obstacle. Then, the brake control device continuously supplies the pressurization brake liquid pressure to the liquid pressure line of the normal vehicle wheel having a low abnormality occurrence risk and suppresses the supply pressure of the pressurization brake liquid pressure to the liquid pressure line of the vehicle wheel having a high abnormality occurrence risk until the abnormality of the liquid pressure line is detected. For this reason, in the brake system, it is possible to increase the brake liquid pressure decrease speed in the liquid pressure line of the vehicle wheel having a high abnormality occurrence risk. Accordingly, the brake control device may promptly detect the abnormality of the liquid pressure line of the vehicle wheel having a high abnormality occurrence risk. Further, since the brake control device continuously supplies the pressurization brake liquid pressure to the liquid pressure line of the normal vehicle wheel having a low abnormality occurrence risk until the abnormality of the liquid pressure line is detected, it is possible to perform a control of improving the steering stability using the pressurization brake liquid pressure.

DESCRIPTION OF EMBODIMENTS

Hereinafter, an embodiment of a brake control device according to the invention will be described in detail with reference to the drawings. However, the invention is not limited to the embodiment.

Embodiment

An embodiment of the brake control device according to the invention will be described with reference to FIGS. 1 to 5.

Figure 1:
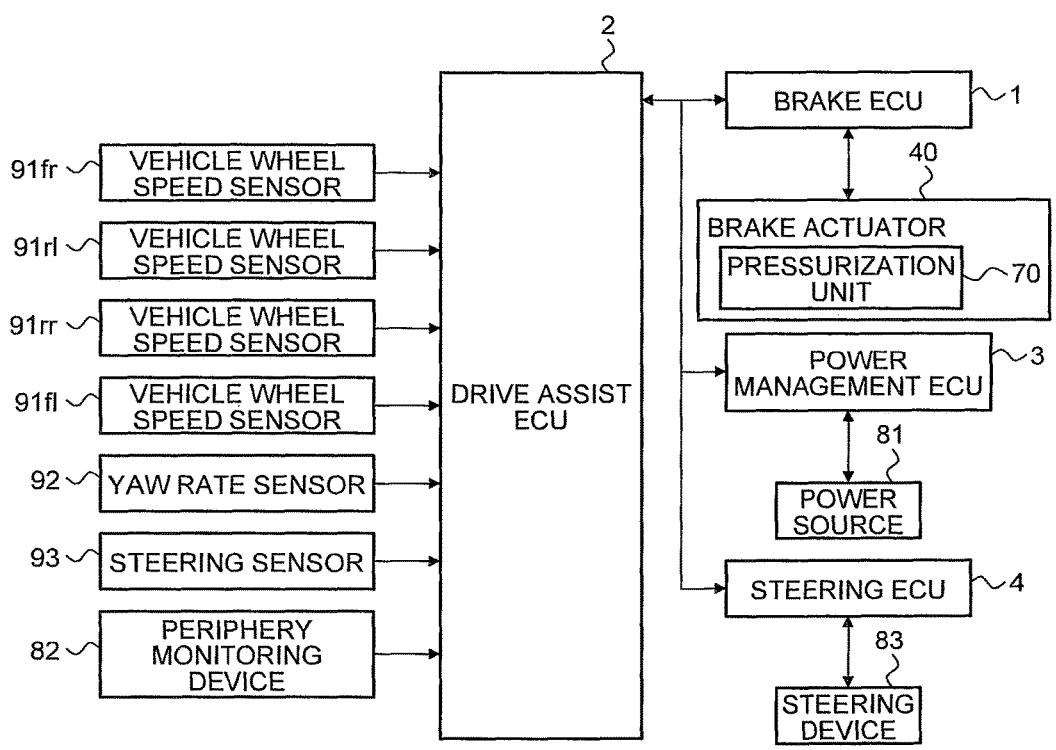
FIG. 1 is a diagram illustrating the configuration of a brake control device according to the invention.

The brake control device of the embodiment is used to control a brake system of an own vehicle and includes an electronic control device (hereinafter, referred to as a "brake ECU") 1 which performs a calculation process involving with the control (FIG. 1).

Figure 2:
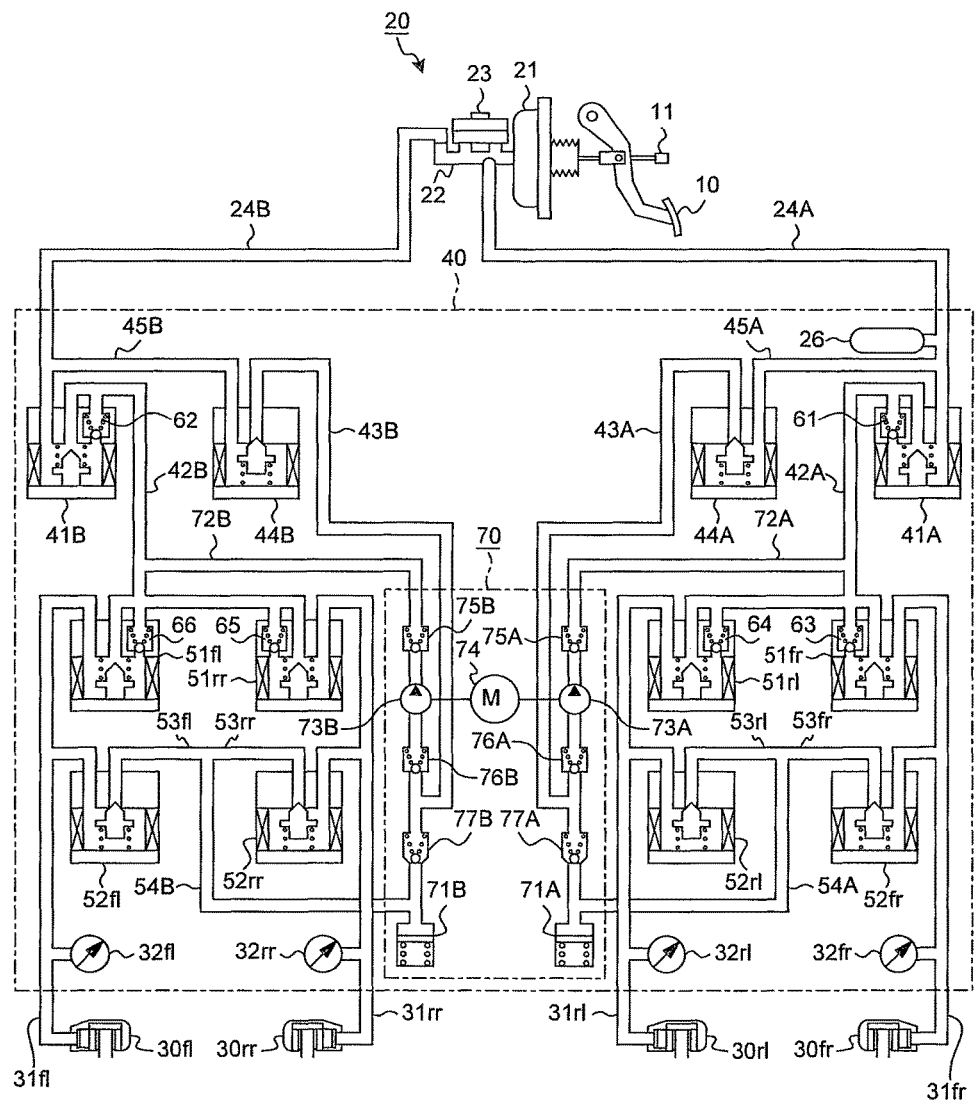
FIG. 2 is a diagram illustrating the configuration of a brake system of an embodiment.

The brake system illustrated in FIG. 2 is connected to the brake ECU 1. The brake system exemplified herein is an example of a system which is mounted on a vehicle using an engine (an engine such as an internal combustion engine) as a power source 81.

The brake system is a so-called disk brake device, and may individually apply a braking force set in response to a master cylinder pressure or an adjusted brake liquid pressure to each vehicle wheel W. The brake system is provided with a liquid pressure generation unit 20 which generates a brake liquid pressure (a master cylinder pressure) in response to the operation amount (hereinafter, referred to as a "brake operation amount") of a brake pedal 10 by a driver, a braking force generation unit 30 which is provided for each vehicle wheel W so as to generate a braking force in response to the brake liquid pressure, and a liquid pressure adjustment unit 40 which supplies the brake liquid pressure of the liquid pressure generation unit 20 to the braking force generation unit 30 while the brake liquid pressure is not adjusted or is adjusted for each vehicle wheel W**. The brake operation amount (a pedal depressing amount or a pedal depressing force) is detected by a pedal sensor 11, and a detection signal thereof is sent to the brake ECU 1.

The symbol "" indicates a suffix corresponding to each vehicle wheel, and indicates "fr", "rl", "rr", or "fl". The symbol "" indicates all of "fr", "rl", "rr", and "fl" unless otherwise mentioned. The symbols "fr", "rl", "rr", and "fl" indicate the suffixes of a right front wheel, a left rear wheel, a right rear wheel, and a left front wheel, respectively.

The liquid pressure generation unit 20 includes a brake booster (a braking force boosting device) 21, a master cylinder 22, and a reservoir tank 23. Two liquid pressure chambers of the master cylinder 22 respectively communicate with a first liquid pressure passageway 24A and a second liquid pressure passageway 24B. A master cylinder pressure sensor 26 which detects a master cylinder pressure is connected to the first liquid pressure passageway 24A of this example. The output signal of the master cylinder pressure sensor 26 is sent to the brake ECU 1. Note that the master cylinder pressure sensor 26 may be connected to the second liquid pressure passageway 24B.

The first liquid pressure passageway 24A and the second liquid pressure passageway 24B are connected to the liquid pressure adjustment unit 40. The liquid pressure adjustment unit 40 is a so-called brake actuator, and supplies a master cylinder pressure or an adjusted brake liquid pressure to the braking force generation unit 30 as a supply target through a liquid pressure passageway 31. A liquid pressure sensor 32 is provided for each vehicle wheel W on the liquid pressure passageway 31. The liquid pressure sensor 32 detects a brake liquid pressure supplied to the braking force, generation unit 30** and sends a detection signal to the brake ECU 1.

The operation of the liquid pressure adjustment unit 40 is controlled by a braking control unit of the brake ECU 1. The liquid pressure adjustment unit 40 is exemplified as a so-called X-pipe with a first liquid pressure circuit which transmits a brake liquid pressure to a right front wheel and a left rear wheel and a second liquid pressure circuit which transmits a brake liquid pressure to a left front wheel and a right rear wheel. In the liquid pressure adjustment unit 40, the first liquid pressure passageway 24A is connected to the first liquid pressure circuit, and the second liquid pressure passageway 24B is connected to the second liquid pressure circuit.

Specifically, the liquid pressure adjustment unit 40 includes a master cut valve 41A which is connected to the first liquid pressure passageway 24A and a master cut valve 41B which is connected to the second liquid pressure passageway 24B. The master cut valve 41A serves as a device that adjusts the flow rate of the brake liquid in the first liquid pressure circuit. The master cut valve 41B serves as a device that adjusts the flow rate of the brake liquid in the second liquid pressure circuit. The master cut valves 41A and 41B adjust the brake liquid pressures ejected from pressurization pumps 73A and 73B to be described later by the control of the braking control unit and drain the brake liquid pressure toward the master cylinder 22.

In the liquid pressure adjustment unit 40, the first liquid pressure passageway 24A is connected to a liquid pressure passageway 42A through the master cut valve 41A, and the second liquid pressure passageway 24B is connected to a liquid pressure passageway 42B through the master cut valve 41B. A liquid pressure passageway 31*fr* of the right front wheel and a liquid pressure passageway 31*rl* of the left rear wheel are connected to the liquid pressure passageway 42A. Further, a liquid pressure passageway 31*fl* of the left front wheel and a liquid pressure passageway 31*rr* of the right rear wheel are connected to the liquid pressure passageway 42B.

On each liquid pressure passageway 31, a maintaining valve 51 and a depressurization valve 52 are provided for each vehicle wheel W. A liquid pressure passageway 53 for each vehicle wheel W is connected to each depressurization valve 52**. Liquid pressure passageways 53*fr* and 53*rl* of the first liquid pressure circuit are connected to an auxiliary reservoir 71A of a pressurization unit 70 to be described later through a liquid pressure passageway 54A. Meanwhile, liquid pressure passageways 53*fl* and 53*rr* of the second liquid pressure circuit are connected to an auxiliary reservoir 71B of the pressurization unit 70 through a liquid pressure passageway 54B.

A check valve 61 is disposed between the first liquid pressure passageway 24A and the liquid pressure passageway 42A in parallel to the master cut valve 41A. The check valve 61 allows only the flow of the brake liquid from the first liquid pressure passageway 24A toward the liquid pressure passageway 42A. In this way, a check valve 62 is disposed between the second liquid pressure passageway 24B and the liquid pressure passageway 42B in parallel to the master cut valve 41B. The check valve 62 allows only the flow of the brake liquid from the second liquid pressure passageway 24B toward the liquid pressure passageway 42B.

Further, in the first liquid pressure circuit, a check valve 63 is disposed between the liquid pressure passageway 42A and the liquid pressure passageway 31*fr* in parallel to a maintaining valve 51*fr*, and a check valve 64 is disposed between the liquid pressure passageway 42A and the liquid pressure passageway 31*rl* in parallel to a maintaining valve 51*rl*. The check valves 63 and 64 allow only the flow of the brake liquid from braking force generation units 30*fr* and 30*rl* toward the master cut valve 41A. Meanwhile, in the second liquid pressure circuit, a check valve 65 is disposed between the liquid pressure passageway 42B and the liquid pressure passageway 31*rr* in parallel to a maintaining valve 51*rr*, and a check valve 66 is disposed between the liquid pressure passageway 42B and the liquid pressure passageway 31*fl* in parallel to a maintaining valve 51*fl*. The check valves 65 and 66 allow only the flow of the brake liquid from braking force generation units 30*rr* and 30*fl* toward the master cut valve 41B.

The liquid pressure adjustment unit 40 is provided with the pressurization unit 70 which pressurizes the brake liquid.

The pressurization unit 70 includes the auxiliary reservoir 71A, a pump passageway 72A, the pressurization pump 73A which is provided on the pump passageway 72A, and check valves 75A and 76A which are provided on the pump passageway 72A in the first liquid pressure circuit. A brake liquid is sent to the auxiliary reservoir 71A through the liquid pressure passageway 54A when depressurization valves 52*fr* and 52*rl* are opened. One end of the pump passageway 72A is connected to the liquid pressure passageway 54A and the auxiliary reservoir 71A, and the other end thereof is connected to the liquid pressure passageway 42A. The pressurization pump 73A is operated by a drive force of a pump motor 74. The check valve 75A prevents the brake liquid ejected from the pressurization pump 73A from returning to the pressurization pump 73A. The check valve 76A prevents the reverse flow of the brake liquid suctioned to the pressurization pump 73A. The braking control unit drives the pump, motor 74, and ejects the brake liquid pressurized by the pressurization pump 73A toward the liquid pressure passageway 42A (that is, the upstream side of the maintaining valves 51*fr* and 51*rl*).

Here, one end of a first suction passageway 43A is connected to the suction side of the pressurization pump 73A (between the liquid pressure passageway 54A and the auxiliary reservoir 71A, and the check valve 76A) in the pump passageway 72A. The braking control unit may supply a master cylinder pressure to the suction side of the pressurization pump 73A through the first suction passageways 43A and a second suction passage way 45A by opening a suction valve 44A. The pump passageway 72A is provided with a check valve 77A so that the master cylinder pressure is not supplied to the liquid pressure passageway 54A or the auxiliary reservoir 71A.

Meanwhile, the pressurization unit 70 has the same configuration as the first liquid pressure circuit even in the second liquid pressure circuit. That is, the second liquid pressure circuit includes the auxiliary reservoir 71B, a pump passageway 72B, the pressurization pump 73B which is provided on the pump passageway 72B, and check valves 75B and 76B which are provided on the pump passageway 72B. Further, the second liquid pressure circuit includes a first suction passageway 43B, a suction valve 44B, a second suction passageway 45B, and a check valve 77B. For this reason, in the second liquid pressure circuit, a brake liquid which is pressurized by the pressurization pump 73B is sent to the liquid pressure passageway 42B (that is, the upstream side of the maintaining valves 51*fl* and 51*rr*) when the pump motor 74 is driven by the braking control unit. At that time, the brake liquid of the liquid pressure passageway 54B or the auxiliary reservoir 71B is supplied to the suction side of the pressurization pump 73B. Further, when the braking control unit opens the suction valve 44B, a master cylinder pressure is supplied to the suction side through the first and second suction passageways 43B and 45B.

The brake system includes a pressurization mode of increasing a pressure supplied to the braking force generation unit 30 of the control target vehicle wheel, a depressurization mode of decreasing a pressure supplied to the braking force generation unit 30 of the control target vehicle wheel, and a maintaining mode of maintaining a brake liquid pressure of the braking force generation unit 30** of the control target vehicle wheel at a predetermined brake liquid pressure.

The braking control unit opens the master cut valve 41A (41B) and the maintaining valve 51 corresponding to the control target vehicle wheel, closes the depressurization valve 52 corresponding to the control target vehicle wheel, and controls the driving state of the pump motor 74 so that the control target vehicle wheel enters the pressurization mode. Further, the braking control unit closes the master cut valve 41A (41B) and the maintaining valve 51 corresponding to the control target vehicle wheel and opens the depressurization valve 52 corresponding to the control target vehicle wheel so that the control target vehicle wheel enters the depressurization mode. Further, the braking control unit closes the master cut valve 41A (41B), the maintaining valve 51, and the depressurization valve 52 corresponding to the control target vehicle wheel so that the control target vehicle wheel enters the maintaining mode.

Further, the brake control device of the embodiment may perform a braking control by using a calculation process result of the drive assist control of the own vehicle. For this purpose, an electronic control device (hereinafter, referred to as a "drive assist ECU") 2 which performs a calculation process of the drive assist control is connected to the brake ECU 1. The drive assist ECU 2 is provided with a drive assist control unit which performs a calculation process of the drive assist control.

The drive assist control unit monitors an obstacle (which may be a static object such as an immovable object or a dynamic object such as the other vehicle) which exists in the periphery of the own vehicle and performs a drive assist control in response to the relation between the own vehicle and the obstacle. For this purpose, a periphery monitoring device 82 which detects an obstacle existing in the periphery of the own vehicle is connected to the drive assist ECU 2. The periphery monitoring device 82 is, for example, a millimeter-wave radar sensor, an image capturing device such as a stereo camera, or an ultrasonic sensor such as a clearance sonar. The periphery monitoring device 82 is disposed at, for example, the front part or the side part of the own vehicle. In the case where the rear of the own vehicle is monitored, the periphery monitoring device 82 may be disposed at the rear part of the own vehicle.

As the specific assist content of the drive assist control, a control after the collision of the own vehicle, a control for avoiding the collision of the own vehicle, and the like may be exemplified.

The drive assist control (hereinafter, referred to as a "post-collision drive assist control") after the collision of the own vehicle is a drive assist control which is selected when the own vehicle has collided with the obstacle instead of the drive assist control (hereinafter, referred to as a "collision avoidance control") for avoiding the collision of the own vehicle. For example, the post-collision drive assist control is a control (hereinafter, referred to as a "the steering stability control") for improving the steering stability or a control for stopping the own vehicle. The control for stopping the own vehicle is, for example, a control for stopping the own vehicle at the current position or stopping the own vehicle while moving the own vehicle to a safe position after the collision occurs. The steering stability control is a control for returning the behavior of the own vehicle which has changed with the collision to the stabler direction. When the braking control unit receives a stop control execution instruction from the drive assist control unit, the braking control unit controls, for example, all vehicle wheels W in the pressurization mode, and supplies a brake liquid pressure pressurized by the pressurization unit 70 to all vehicle wheels W. Further, when the braking control unit receives a steering stability control execution instruction and a target yaw moment for stabilizing the behavior from the drive assist control unit, the braking control unit controls the vehicle wheel W as a pressurization target in the pressurization mode in response to the target yaw moment, supplies a brake liquid pressure pressurized by the pressurization unit 70 to the vehicle wheel W, and controls the vehicle wheel W** as a depressurization target in the depressurization mode in response to the target yaw moment.

Further, a power management ECU 3 or a steering ECU 4 is connected to the drive assist ECU 2 other than the brake ECU 1. The power management ECU 3 is an electronic control device which performs a calculation process of the output control of the power source 81. When an output control unit of the power management ECU 3 receives a post-collision drive assist control execution instruction from the drive assist control unit, the output control unit adjusts the output of the power source 81 in response to the control type. The steering ECU 4 is an electronic control device which performs a calculation process of a control of steering a steering device 83. The steering device 83 is a device capable of adjusting the steering angles and the steering directions of the steering wheels Wfl and Wfr regardless of the steering operation of the driver. For example, when the steering control unit of the steering ECU 4 receives a post-collision drive assist control execution instruction from the drive assist control unit, the steering control unit performs a control of steering the steering wheels Wfl and Wfr so that a target yaw moment is generated in response to the control type.

The collision avoidance control is, for example, a brake assist control or a pre-collision brake control. The brake assist control is a control of supplying a brake liquid pressure higher than the brake liquid pressure in response to the driver's brake operation to each vehicle wheel W and generating a larger braking force compared to the brake operation. The pre-collision brake control is a control of supplying a high brake liquid pressure to each vehicle wheel W and generating a large braking force in the own vehicle so as to reduce a collision damage when there is a possibility that a collision may occur in the own vehicle. When the braking control unit receives a brake assist control execution instruction or a pre-collision brake control execution instruction from the drive assist control unit, the braking control unit controls, for example, the liquid pressure adjustment unit 40 so that all vehicle wheels. W are controlled in the pressurization mode, and supplies a pressurization brake liquid pressure pressurized by the pressurization unit 70 to all vehicle wheels W.

In the own vehicle, there is a case in which a collision may not be avoided in spite of the collision avoidance control. Then, in that case, there is a possibility that the brake liquid may leak due to the damage of the brake system with the collision. For this reason, the brake ECU 1 is provided with an abnormality detection unit which detects the abnormality of the liquid pressure line with reduction in the brake liquid pressure. For example, when the brake liquid pressure detected by the liquid pressure sensor 32 and the like becomes a predetermined pressure as a threshold value or less, the abnormality detection unit performs a detection that an abnormality occurs in the corresponding liquid pressure line. When the abnormality of the liquid pressure line is detected, the liquid pressure adjustment unit of the brake ECU 1** interrupts the supply of the brake liquid pressure to the liquid pressure line of which the abnormality is detected, for example, as in the related art.

Here, in the brake system, the pressurization brake liquid pressure of the pressurization unit 70 is exerted on the liquid pressure line (the liquid pressure passageway or the like) from the pressurization unit 70 to the braking force generation units 30 of all vehicle wheels W by the collision avoidance control. Then, the pressurization brake liquid pressure of the pressurization unit 70 is exerted on the liquid pressure line of the pressurization target by the post-collision drive assist control after the collision occurs. For this reason, in the brake system, even when any one of the liquid pressure lines of the vehicle wheels W** is damaged by the collision and the brake liquid leaks from the damaged position, the brake liquid pressure of the damaged liquid pressure line gently decreases when the pressurization brake liquid pressure is exerted on the damaged liquid pressure line. Then, since it takes a time until the brake liquid pressure becomes the predetermined pressure or less at that time, the abnormality detection unit may not determine whether the brake liquid pressure is decreased by the abnormality such as a damage of the liquid pressure line in the meantime. That is, the brake system has a possibility that it may take a time until the abnormality of the liquid pressure line is detected due to the action of the pressurization brake liquid pressure although the liquid pressure line damaged by the collision exists.

Meanwhile, when the pressurization brake liquid pressure is not exerted on the liquid pressure line of the damaged vehicle wheel W** by stopping the operation of the pressurization unit 70 before or immediately after the collision occurs, the abnormality detection unit may early detect the abnormality of the liquid pressure line. However, in the brake system, since the pressurization brake liquid pressure is not exerted on the normal liquid pressure line by stopping the operation of the pressurization unit 70, the post-collision drive assist control may not be performed until the abnormality of the damaged liquid pressure line is detected.

Further, in the brake system, a liquid pressure line of the vehicle wheel W different from the liquid pressure line of the damaged vehicle wheel W exists in the same liquid pressure circuit. For this reason, when an abnormality caused by the collision occurs only in the liquid pressure line of one vehicle wheel W on the same liquid pressure circuit, the liquid pressure line of the normal vehicle wheel W has a possibility that the brake liquid pressure may be decreased due to the influence of the leakage of the brake liquid from the damaged position until the abnormality of the liquid pressure line of the damaged vehicle wheel W is detected. Accordingly, the normal vehicle wheel W has a possibility that a braking force may decrease compared to the target value until the abnormality of the damaged liquid pressure line is detected even when the post-collision drive assist control is performed.

Therefore, in the brake control device, when there is a possibility that the own vehicle may collide with the obstacle, the drive assist control unit performs the collision avoidance control by controlling the pressurization unit 70 so as to supply the pressurization brake liquid pressure of the pressurization unit 70 to the liquid pressure lines of all vehicle wheels W, and generates a high braking force in the own vehicle. When the collision may not be avoided, the pressurization brake liquid pressure is continuously supplied until at least after the collision. Specifically, when there is a possibility that the own vehicle collides with the obstacle and the possibility of the collision is high, the brake assist control is performed so as to supply the pressurization brake liquid pressure to the liquid pressure lines of all vehicle wheels W. Then, when it is determined that the collision may not be avoided, the pre-collision brake control is performed so as to increase the pressurization brake liquid pressure for the liquid pressure lines of all vehicle wheels W**.

For this reason, the drive assist ECU 2 is provided with a collision possibility determination unit which determines the possibility of the collision between the own vehicle and the obstacle, determines whether the possibility of the collision is high, and determines whether the collision may be avoided.

Further, in the brake control device, when the collision may not be avoided, the collision part of the own vehicle, to collide with the obstacle is estimated before the collision occurs, and the liquid pressure line of the vehicle wheel W having a high possibility that the vehicle wheel may be damaged by the collision (that is, the abnormality occurrence risk is high) is estimated based on the estimation information. Then, in the brake control device, the pressurization brake liquid pressure is continuously supplied to the liquid pressure line of the normal vehicle wheel W having a low abnormality occurrence risk and the supply pressure of the pressurization brake liquid pressure to the liquid pressure line of the vehicle wheel W** having a high abnormality occurrence risk is suppressed until the abnormality of the liquid pressure line is detected by the abnormality detection unit. The suppression of the supply pressure of the pressurization brake liquid pressure is performed until the abnormality of the liquid pressure line is detected by the abnormality detection unit, for example, at least after occurrence of the collision. Further, the suppression of the supply pressure of the pressurization brake liquid pressure may be started from at least before the collision occurs (for example, immediately before the collision occurs) and may be performed until the abnormality of the liquid pressure line is detected by the abnormality detection unit after the collision occurs.

For this purpose, the drive assist ECU 2 is provided with a collision part estimation unit which estimates the collision part in the own vehicle, an abnormal part estimation unit which estimates the liquid pressure line of the vehicle wheel W** having a high abnormality occurrence risk, and a pressurization adjustment unit which continues or suppresses the supply of the pressurization brake liquid pressure in response to the abnormality occurrence risk.

Thus, the brake liquid pressure decrease speed becomes fast in the liquid pressure line of the vehicle wheel W having a high abnormality occurrence risk compared to the case where the pressurization brake liquid pressure is continuously supplied. For this reason, in the brake control device, the abnormality of the liquid pressure line may be promptly detected by the abnormality detection unit. Meanwhile, in the brake control device, since the pressurization brake liquid pressure is continuously supplied to the liquid pressure line of the vehicle wheel W having a low abnormality occurrence risk, the target braking force of the post-collision drive assist control may be generated in the normal vehicle wheel W** even until the abnormality is detected.

Figure 3:
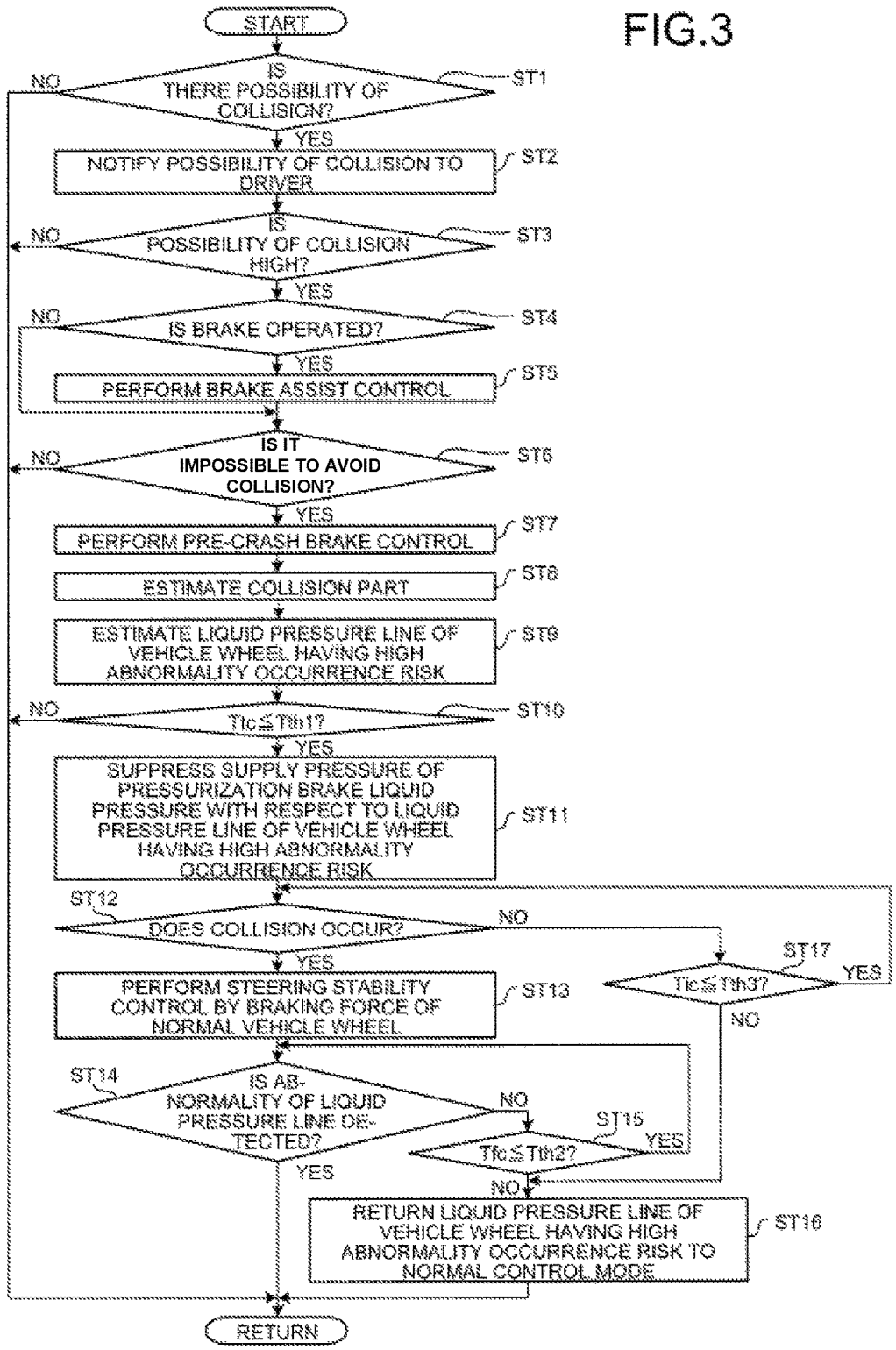
FIG. 3 is a flowchart illustrating a calculation process of the brake control device according to the invention.

Hereinafter, the calculation process of the brake control device of the embodiment will be described with reference to the flowchart of FIG. 3.

The collision possibility determination unit determines whether there is a possibility that the own vehicle may collide with the obstacle (step ST1). This determination is performed by the known determination method of the collision avoidance control or the like. The collision possibility determination unit uses, for example, the detection information of the periphery monitoring device 82, a vehicle wheel speed sensor 91, a yaw rate sensor 92, and a steering sensor 93 for the determination. The vehicle wheel speed sensor 91 is provided for each vehicle wheel W**, detects each vehicle wheel speed, and sends the detection signal to the drive assist ECU 2. In the drive assist ECU 2, the vehicle speed of the own vehicle may be calculated based on the vehicle wheel speed. The yaw rate sensor 92 detects the yaw rate of the own vehicle and sends the detection signal to the drive assist ECU 2. The steering sensor 93 detects a steering angle of a steering wheel (not illustrated) in response to the driver's steering operation and sends the detection signal to the drive assist ECU 2. In the drive assist ECU 2, the traveling posture (the advancing direction) of the own vehicle may be determined based on the detection signals of the yaw rate sensor 92 and the steering sensor 93. Accordingly, the collision possibility determination unit determines the existence of the obstacle of which the gap with respect to the own vehicle is estimated to be decreased by using the detection information. Then, when such an obstacle is detected, the collision possibility determination unit determines whether the obstacle may collide with the own vehicle based on the speed of the obstacle relative to the own vehicle, the intersection angle formed between the advancing directions of the own vehicle and the obstacle, the gap between the own vehicle and the obstacle, and the like. When there is no possibility of the collision, the collision possibility determination unit once ends the calculation process.

When there is a possibility that the own vehicle may collide with the obstacle, the drive assist ECU 2 notifies the situation to the driver (step ST2).

For example, the drive assist ECU 2 is provided with a notification control unit which transmits information to a passenger inside the vehicle. The notification control unit notifies the possibility of the collision of the own vehicle as a visual information item or an audio information item. For example, the notification control unit displays characters or marks used to notify this situation on a display unit (not illustrated) inside the vehicle. Further, the notification control unit outputs a voice or a warning sound notifying this situation from a speaker (not illustrated) inside the vehicle.

The collision possibility determination unit determines whether the possibility of the collision of the own vehicle is high (step ST3). This determination may be performed based on the speed of the obstacle relative to the own vehicle, the intersection angle formed between the advancing directions of the own vehicle and the obstacle, the gap between the own vehicle and the obstacle, and the like. When the possibility of the collision is low, the drive assist ECU 2 once ends the calculation process.

Here, it is considered that the driver who recognizes the possibility of the collision performs the brake operation as quick as possible. However, there is a case in which the brake operation is not performed due to, for example, a late recognition. For this reason, the drive assist control unit of the drive assist ECU 2 determines whether the driver performs the brake operation when the possibility of the collision is high (step ST4). This determination is performed based on the brake operation amount detected by the pedal sensor 11. Furthermore, this determination may be performed by using an ON-signal of a stop lamp switch (not illustrated).

When the brake operation is not performed, the drive assist control unit causes the routine to proceed to step ST6. On the contrary, when the driver performs the brake operation, the drive assist control unit performs the brake assist control (step ST5).

The collision possibility determination unit determines whether the collision between the own vehicle and the obstacle may not be avoided (step ST6). This determination may be a determination on whether the collision may not be avoided in the current traveling posture (the advancing direction) of the own vehicle or may be a determination on whether the collision may not be avoided even when the steering control unit of the steering ECU 4 performs the steering control so as to change the traveling posture of the own vehicle from current traveling posture. This determination may be performed based on the speed of the obstacle relative to the own vehicle, the intersection angle formed between the advancing directions of the own vehicle and the obstacle, the gap between the own vehicle and the obstacle, and the like. When it is determined that the collision may be avoided, the drive assist ECU 2 once ends the calculation process.

When it is determined that the collision may not be avoided, the drive assist control unit performs the pre-collision brake control for the collision (step ST7). When the brake assist control is performed already, the pre-collision brake control is performed so that the pressurization brake liquid pressure is further increased to the required brake liquid pressure, and hence a braking force is increased more than that of the brake assist control. Meanwhile, when the brake assist control is not performed, the pressurization brake liquid pressure is increased to the required brake liquid pressure, and hence a braking force is increased. The process of step ST7 may be performed until the determination of step ST10 is performed after it is determined that the collision may not be avoided. Furthermore, if there is no time for the pre-collision brake control, the brake assist control is continuously performed if the brake assist control is performed already.

When the collision may not be avoided, the collision part estimation unit estimates the collision part, of the own vehicle, to collide with the obstacle (step ST8). This estimation may be performed based on the speed of the obstacle relative to the own vehicle, the intersection angle formed between the advancing directions of the own vehicle and the obstacle, the gap between the own vehicle and the obstacle, and the like. Then, the abnormal part estimation unit estimates the liquid pressure line of the vehicle wheel W having a high abnormality occurrence risk among the liquid pressure lines of all vehicle wheels W based on the estimated collision part (step ST9).

The pressurization adjustment unit calculates an estimation time Ttc until the own vehicle collides with the obstacle, from the current time point and determines whether the estimation time Ttc is within a predetermined time Tth1 (step ST10). The estimation time Ttc until the collision occurs may be obtained based on the speed of the obstacle relative to the own vehicle, the intersection angle formed between the advancing directions of the own vehicle and the obstacle, the gap between the own vehicle and the obstacle, and the like. The predetermined time Tth1 is set based on the speed of the obstacle relative to the own vehicle, the intersection angle formed between the advancing directions of the own vehicle and the obstacle, the gap between the own vehicle and the obstacle, and the like.

When the estimation time Ttc until the collision occurs exceeds the predetermined time Tth1, the pressurization adjustment unit once ends the calculation process. Meanwhile, when the estimation time Ttc until the collision occurs is within the predetermined time Tth1, this means a state immediately before the collision occurs, and hence the pressurization adjustment unit suppresses the supply pressure of the pressurization brake liquid pressure to the liquid pressure line of the vehicle wheel W having a high abnormality occurrence risk (step ST11). For example, in the liquid pressure line of the vehicle wheel W having a high abnormality occurrence risk, the supply pressure of the pressurization brake liquid pressure is decreased compared to the liquid pressure line of the vehicle wheel W having a low abnormality occurrence risk or the supply of the pressurization brake liquid pressure is interrupted. In the latter case, the vehicle wheel W having a high abnormality occurrence risk is switched from the pressurization mode to the maintaining mode.

Note that in this example, the process of step ST11 is performed before the collision occurs. However, there is a possibility that the own vehicle may collide with the obstacle during the calculation process performed until step ST11. For this reason, when the collision occurs before step ST11, the process of step ST11 is performed after the collision occurs.

The collision determination unit of the drive assist ECU 2 determines whether the collision between the own vehicle and the obstacle has occurred (step ST12).

When the collision has occurred, the drive assist control unit performs the steering stability control by controlling the braking force of the normal vehicle wheel having a low abnormality occurrence risk except for the vehicle wheel having a high abnormality occurrence risk (step ST13).

The abnormality detection unit continuously performs a determination on whether the abnormality occurs in the liquid pressure line for all vehicle wheels W after occurrence of the collision. For this reason, the drive assist control unit determines whether the abnormality of the liquid pressure line is detected (step ST14**).

When the abnormality of the liquid pressure line is detected, the drive assist control unit once ends the calculation process while continuing to perform the steering stability control. At that time, when the supply of the brake liquid pressure to the liquid pressure line of which the abnormality is detected is not interrupted, the liquid pressure adjustment unit interrupts the supply.

Figure 4:
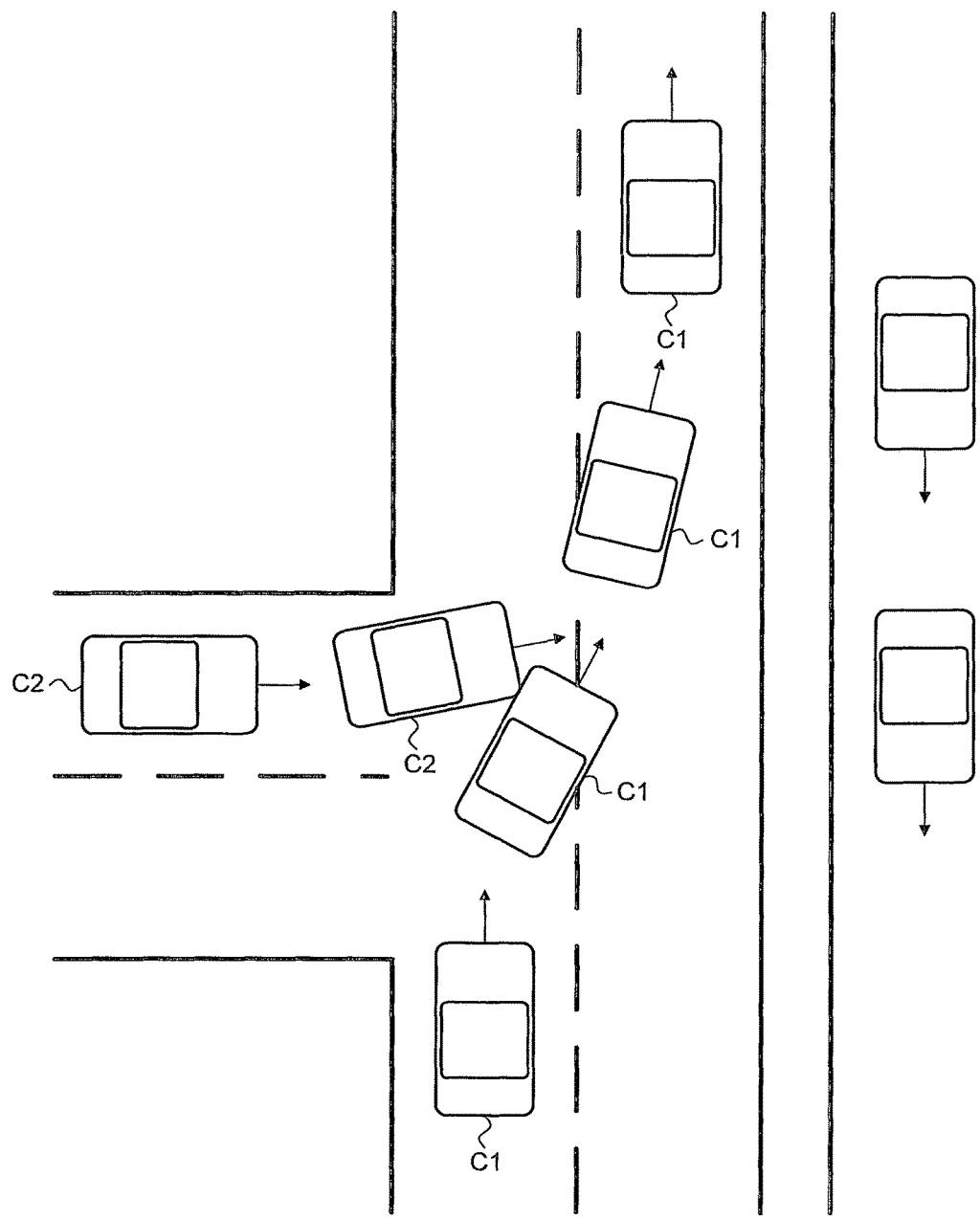
FIG. 4 is a diagram illustrating an example of a collision case.
Figure 5:
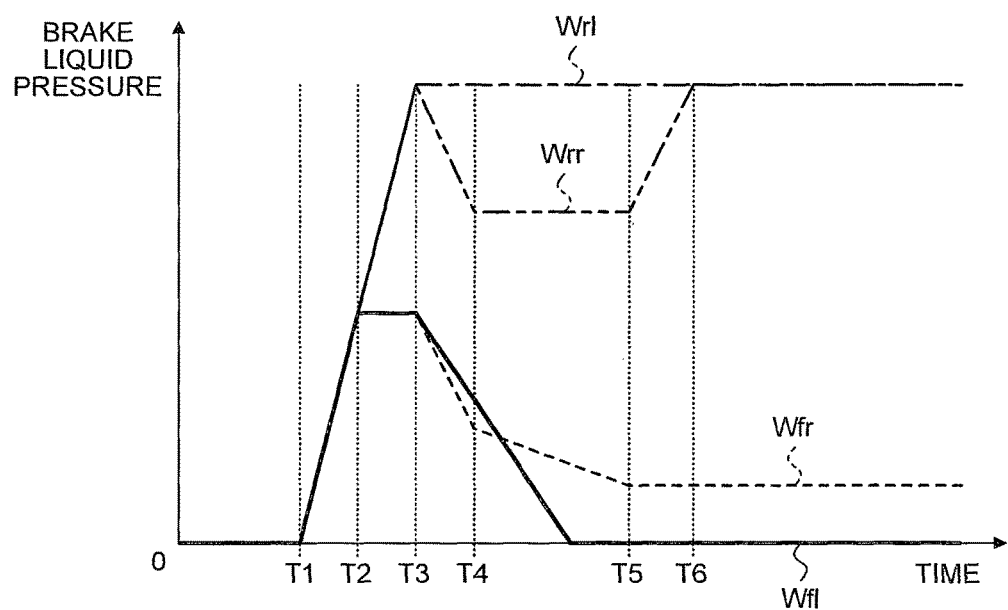
FIG. 5 is a time chart illustrating a brake liquid pressure control of a collision case of FIG. 5.

For example, FIG. 4 illustrates a scene in which the other vehicle C2 which advances from the left side of the own vehicle C1 collides with the left surface of the front part of the own vehicle C1. FIG. 5 illustrates a time chart of the calculation process of the brake control device in that case.

In this case, the left surface of the front part of the own vehicle C1 is estimated as the collision part, of the own vehicle C1, to collide with the obstacle (the other vehicle C2) after it is determined that the collision may not be avoided at the time T1, and the liquid pressure line of the left front wheel Wfl is estimated as the liquid pressure line having a high abnormality occurrence risk. Between the time T1 to the time T2, the pressurization brake liquid pressure is supplied to the liquid pressure lines of all vehicle wheels W, and the brake liquid pressure of each liquid pressure line increases. At the time T2**, the left front wheel Wfl having a high abnormality occurrence risk is switched from the pressurization mode to the maintaining mode, and the supply of the pressurization brake liquid pressure to the liquid pressure line of the left front wheel Wfl is stopped.

In this example, since the collision part is estimated as the left surface of the front part of the own vehicle C1, a yaw moment is generated in the clockwise direction of the own vehicle C1 with the collision. For this reason, there is a need to generate a target yaw moment in the counter-clockwise direction against the yaw moment in order to ensure the steering stability after the collision of the own vehicle C1 occurs. For this reason, at the time T2, the right front wheel Wfr is also switched from the pressurization mode to the maintaining mode so as to stop the supply of the pressurization brake liquid pressure to the liquid pressure line.

At the time T3, the collision between the own vehicle C1 and the obstacle (the other vehicle C2) occurs, and hence the liquid pressure line of the left front wheel Wfl is damaged. For this reason, the drive assist control unit switches the normal right front wheel Wfr from the maintaining mode to the depressurization mode, switches the normal right rear wheel Wrr from the pressurization mode to the depressurization mode, and switches the normal left rear wheel Wrl from the pressurization mode to the maintaining mode at the time T3. Thus, in the brake system, the brake liquid pressure of the normal left rear wheel Wrl is maintained in a pressurized state, and a target yaw moment in the counter-clockwise direction is generated in the own vehicle C1 as the brake liquid pressures of the normal right front wheel Wfr and the right rear wheel Wrr decrease, thereby stabilizing the behavior of the own vehicle. Meanwhile, since the brake liquid pressure does not increase or decrease in the liquid pressure line of the damaged left front wheel Wfl, the brake liquid pressure promptly decreases with the damage. For this reason, the abnormality detection unit may promptly detect the abnormality of the liquid pressure line of the left front wheel Wfl.

When it is determined that the abnormality of the liquid pressure line is not detected in step ST14, the drive assist control unit calculates an elapse time Tfc from the time at which the collision occurs, and determines whether the elapse time Tfc is within a predetermined time Tth2 (step ST15). The predetermined time Tth2 is determined based on various information obtained when the collision occurs. These various information include, for example, the speed of the obstacle relative to the own vehicle, the acceleration of the own vehicle, the intersection angle formed between the advancing directions of the own vehicle and the obstacle, the collision part of the own vehicle, and the like when the collision occurs.

When the elapse time Tfc is within the predetermined time Tth2, the drive assist control unit returns the routine to step ST14.

Meanwhile, when the elapse time Tfc exceeds the predetermined time Tth2, the drive assist control unit determines that an abnormality does not occur in the liquid pressure line of the vehicle wheel W having a high abnormality occurrence risk and returns the brake liquid pressure control mode with respect to the liquid pressure line to the normal control mode (step ST16). The normal control mode is a control mode selected when the control of step ST11** is not performed. Thus, when the steering stability control is still performed, the liquid pressure line is also controlled so as to have the target brake liquid pressure in the steering stability control.

When it is determined that the collision does not occur in step ST12, the drive assist control unit determines whether a time Tic from the determination time at which the collision may not be avoided in step ST6 is within a predetermined time Th3 (step ST17). The predetermined time Th3 is determined based on various information obtained when it is determined that the collision may not be avoided. These various information include, for example, the speed of the obstacle relative to the own vehicle, the intersection angle formed between the advancing directions of the own vehicle and the obstacle, the gap between the own vehicle and the obstacle, and the like when the determination is performed.

When the time Tic is within the predetermined time Th3, the possibility of the collision still remains, and hence the drive assist control unit returns the routine to step ST12. Meanwhile, when the time Tic exceeds the predetermined time Th3, the drive assist control unit determines that the collision is avoided due to, for example, a change in the traveling posture of the obstacle (the other vehicle), and causes the routine to proceed to step ST16 so that the brake liquid pressure control mode with respect to the liquid pressure line of the vehicle wheel W** having a high abnormality occurrence risk is returned to the normal control mode.

As described above, when the collision may not be avoided, the brake control device of the embodiment supplies the pressurization brake liquid pressure to the liquid pressure lines of all vehicle wheels W and estimates the liquid pressure line of the vehicle wheel W having a high occurrence risk of abnormality due to the collision based on the estimated collision part to collide with the obstacle. Then, the brake control device continuously supplies the pressurization brake liquid pressure to the liquid pressure line of the vehicle wheel W having a low abnormality occurrence risk and suppresses the supply pressure of the pressurization brake liquid pressure to the liquid pressure line of the vehicle wheel W having a high abnormality occurrence risk until the abnormality of the liquid pressure line is detected. For this reason, in the brake system, it is possible to increase the brake liquid pressure decrease speed in the liquid pressure line of the vehicle wheel W having a high abnormality occurrence risk. Accordingly, the brake control device may promptly detect the abnormality of the liquid pressure line of the vehicle wheel W having a high abnormality occurrence risk. Further, since the pressurization brake liquid pressure is continuously supplied to the liquid pressure line of the vehicle wheel W** having a low abnormality occurrence risk until the abnormality of the liquid pressure line is detected, the brake control device may perform the steering stability control by using the pressurization brake liquid pressure.

Modified Example

The brake control device of the above-described embodiment has been described on the assumption that the brake system of FIG. 2 mounted on the vehicle using an engine as the power source 81 is a control target. However, the brake control device may be described on the assumption that a brake system of a hybrid vehicle using an engine and a rotary machine (a motor or the like) as the power source 81 is a control target.

Figure 6:
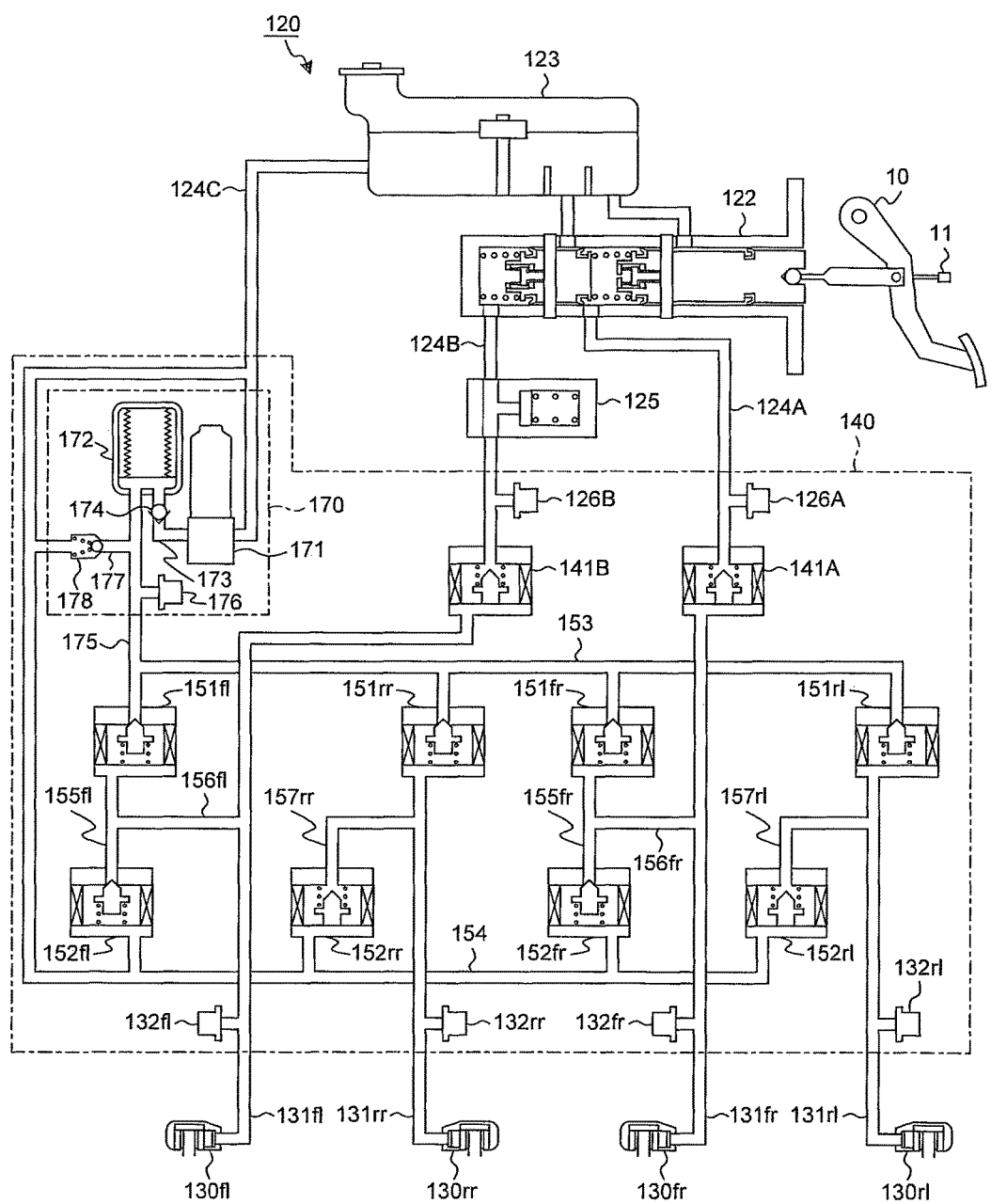
FIG. 6 is a diagram illustrating the configuration of a brake system of a modified example.

The brake system of the modified example is a disk brake device similarly to the brake system of FIG. 2, and may individually apply a braking force set in response to the master cylinder pressure or the adjusted brake liquid pressure to each vehicle wheel W. This brake system is provided with a liquid pressure generation unit 120, a braking force generation unit 130 for each vehicle wheel W**, and a liquid pressure adjustment unit 140 similarly to the brake system of FIG. 2 (FIG. 6).

The liquid pressure generation unit 120 includes a master cylinder 122 and a reservoir tank 123. The master cylinder 122 causes a first liquid pressure passageway 124A to communicate with one liquid pressure chamber and causes a second liquid pressure passageway 124B to communicate with another liquid pressure chamber. Further, a third liquid pressure passageway 124C is connected to the reservoir tank 123.

A stroke simulation device 125 is provided on the second liquid pressure passageway 124B. The stroke simulation device 125 includes a stroke simulator and a simulator control valve. The simulator control valve is a so-called normally closed electromagnetic valve, and may change the valve opening degree by the control of the braking control unit of the brake ECU 1. When the simulator control valve is opened, a brake liquid is sent from the second liquid pressure passageway 124B to the stroke simulator.

Further, master cylinder pressure sensors 126A and 126B are respectively connected to the first liquid pressure passageway 124A and the second liquid pressure passageway 124B. The master cylinder pressure sensor 126B is disposed at the downstream side in relation to the stroke simulation device 125 on the second liquid pressure passageway 124B. The output signals of the master cylinder pressure sensors 126A and 126B are sent to the brake ECU 1.

The liquid pressure adjustment unit 140 is a brake actuator which is controlled by the braking control unit, and supplies the master cylinder pressure or the adjusted brake liquid pressure to the braking force generation unit 130 as the supply target through a liquid pressure passageway 131. A liquid pressure sensor 132 is provided for each vehicle wheel W on the liquid pressure passageway 131. The liquid pressure sensor 132 detects the brake liquid pressure supplied to the braking force generation unit 130** and sends the detection signal to the brake ECU 1.

The liquid pressure adjustment unit 140 is provided with two switching valves 141A and 141B. The switching valve 141A connects the first liquid pressure passageway 124A to a liquid pressure passageway 131$fr$ of the right front wheel Wfr, and causes both passageways to communicate with each other when the valve is opened. The switching valve 141B connects the second liquid pressure passageway 124B to a liquid pressure passageway 131$fl$ of the left front wheel Wfl, and causes both passageways to communicate with each other when the valve is opened.

Each vehicle wheel W includes a maintaining valve 151 and a depressurization valve 152. A liquid pressure passageway 153 is connected to the upstream sides of all maintaining valves 151. Further, a liquid pressure passageway 154 is connected to the downstream sides of all depressurization valves 152**. The liquid pressure passageway 154 is connected to the third liquid pressure passageway 124C.

One end of a liquid pressure passageway 155$fl$ and one end of a liquid pressure passageway 155$fr$ are respectively connected to the downstream sides of maintaining valves 151$fl$ and 151$fr$ of the front wheels. The other end of the liquid pressure passageway 155$fl$ and the other end of the liquid pressure passageway 155$fr$ are respectively connected to the upstream sides of the depressurization valves 152$fl$ and 152$fr$ of the front wheels. Meanwhile, the liquid pressure passageways 155$fl$ and 155$fr$ are respectively connected to the liquid pressure passageways 131$fl$ and 131$fr$ through the liquid pressure passageways 156$fl$ and 156$fr$.

Meanwhile, liquid pressure passageways 131$rl$ and 131$rr$ are respectively connected to the downstream sides of maintaining valves 151$rl$ and 151$rr$ of the rear wheels. Then, in the rear wheels, the liquid pressure passageways 131$rl$ and 131$rr$ are respectively connected to the upstream sides of depressurization valves 152$rl$ and 152$rr$ through liquid pressure passageways 157$rl$ and 157$rr$.

The liquid pressure adjustment unit 140 is provided with a pressurization unit 170 which pressurizes a brake liquid by the control of the braking control unit and supplies the pressurization brake liquid pressure to the liquid pressure passageway 153 (that is, the upstream side of the maintaining valve 151**).

The pressurization unit 170 includes a pump motor 171 and an accumulator 172. The third liquid pressure passageway 124C is connected to the pump motor 171, and suctions a brake liquid from the reservoir tank 123 or the liquid pressure passageway 154. The pump motor 171 pressurizes the suctioned brake liquid, and sends the brake liquid to the accumulator 172 through a liquid pressure passageway 173. The liquid pressure passageway 173 is provided with a check valve 174 which prevents the reverse flow of the brake liquid of the accumulator 172 toward the pump motor 171.

The pressurization brake liquid pressure (the accumulator pressure) of the accumulator 172 is supplied to the liquid pressure passageway 153 (the upstream side of the maintaining valve 151) through a liquid pressure passageway 175. The liquid pressure passageway 175 is provided with an accumulator pressure sensor 176. The accumulator pressure sensor 176 detects the accumulator pressure supplied to the liquid pressure passageway 153 (the upstream side of the maintaining valve 151), and sends the detection signal to the brake ECU 1.

A liquid pressure passageway 177 is connected to a position between the accumulator 172 and the accumulator pressure sensor 176 in the liquid pressure passageway 175. The liquid pressure passageway 177 is further connected to the liquid pressure passageway 154. The liquid pressure passageway 177 is provided with a check valve 178 which causes a brake liquid to flow from the liquid pressure passageway 175 only to the liquid pressure passageway 154.

The brake system includes a pressurization mode of increasing the supply liquid pressure to the braking force generation unit 130 of the control target vehicle wheel, a depressurization mode of decreasing the supply liquid pressure to the braking force generation unit 130 of the control target vehicle wheel, and a maintaining mode of maintaining the brake liquid pressure of the braking force generation unit 130** of the control target vehicle wheel at a predetermined brake liquid pressure.

The braking control unit opens the maintaining valve 151 of the control target vehicle wheel, closes the depressurization valve 152 of the control target vehicle wheel, and controls the driving state of the pump motor 171 so that the control target vehicle wheel enters the pressurization mode. Further, the braking control unit closes the maintaining valve 151 of the control target vehicle wheel and opens the depressurization valve 152 of the control target vehicle wheel so that the control target vehicle wheel enters the depressurization mode. Further, the braking control unit closes the maintaining valve 151 and the depressurization valve 152 of the control target vehicle wheel so that the control target vehicle wheel enters the maintaining mode.

The brake control device of the modified example may obtain the same effect as the embodiment by performing the same control as the embodiment.

REFERENCE SIGNS LIST

1 brake ECU
2 drive assist ECU
30*fl*, 30*fr*, 30*rl*, 30*rr*, 130*fl*, 130*fr*, 130*rl*, 130*rr* braking force generation unit
40, 140 liquid pressure adjustment unit
70, 170 pressurization unit

The invention claimed is:

1. A brake control device comprising:
    a liquid pressure line provided for each vehicle wheel and supplied with a brake liquid pressure;
    a brake provided for each vehicle wheel and configured to generate a braking force in response to the brake liquid pressure supplied from each liquid pressure line;
    a pressurization pump configured to supply a pressurization brake liquid pressure to the liquid pressure line;
    a brake electronic control device configured to detect, using a liquid pressure sensor, an abnormality of the liquid pressure line at a time the brake liquid pressure of the liquid pressure line is not greater than a threshold value;
    a brake actuator configured to interrupt the supply of the brake liquid pressure to the liquid pressure line of which the abnormality is detected; and
    a drive assist electronic control device configured to:
        determine a possibility of a collision between an own vehicle and an obstacle, and determine whether the collision is avoidable;
        perform a collision avoidance control by controlling the pressurization pump to supply the pressurization brake liquid pressure to each liquid pressure line at a time the possibility of the collision between the own vehicle and the obstacle exists and the collision is not avoidable, and perform a post-collision drive assist control by supplying the pressurization brake liquid pressure to the liquid pressure line of each vehicle wheel as a control target vehicle wheel after the collision;
        estimate a collision part, of the own vehicle, to collide with the obstacle;
        estimate the liquid pressure line of the vehicle wheel having a high occurrence risk of abnormality due to the collision based on estimation of the collision part; and
        upon the electronic control device determining the possibility of collision between the own vehicle and the obstacle and determining that the collision is not avoidable, supply the pressurization brake liquid pressure to the liquid pressure line of a normal vehicle wheel having a low abnormality occurrence risk and suppress the supply pressure of the pressurization brake liquid pressure to the liquid pressure line of the vehicle wheel having a high abnormality occurrence risk until the abnormality of the liquid pressure line is detected by the brake electronic control device.

2. The brake control device according to claim 1, wherein the drive assist electronic control device is configured to:
    detect the collision between the own vehicle and the obstacle, and
    suppress the supply pressure of the pressurization brake liquid pressure to the liquid pressure line of the vehicle wheel having a high abnormality occurrence risk until the abnormality of the liquid pressure line is detected by the brake electronic control device at least after the collision.

3. The brake control device according to claim 2, wherein the drive assist electronic control device suppresses the supply pressure of the pressurization brake liquid pressure to the liquid pressure line of the vehicle wheel having a high abnormality occurrence risk by decreasing the supply pressure of the pressurization brake liquid pressure compared to the liquid pressure line of the normal vehicle wheel having a low abnormality occurrence risk or interrupting the supply of the pressurization brake liquid pressure.

4. The brake control device according to claim 1, wherein the drive assist electronic control device is configured to:
    detect the collision between the own vehicle and the obstacle, and
    suppress the supply pressure of the pressurization brake liquid pressure to the liquid pressure line of the vehicle wheel having a high abnormality occurrence risk from at least before the collision until the abnormality of the liquid pressure line is detected by the brake electronic control device after the collision.

5. The brake control device according to claim 4, wherein the drive assist electronic control device suppresses the supply pressure of the pressurization brake liquid pressure to the liquid pressure line of the vehicle wheel having a high abnormality occurrence risk by decreasing the supply pressure of the pressurization brake liquid pressure compared to the liquid pressure line of the normal vehicle wheel having a low abnormality occurrence risk or interrupting the supply of the pressurization brake liquid pressure.

6. The brake control device according to claim 1, wherein the drive assist electronic control device suppresses the supply pressure of the pressurization brake liquid pressure to the liquid pressure line of the vehicle wheel having a high abnormality occurrence risk by decreasing the supply pressure of the pressurization brake liquid pressure compared to the liquid pressure line of the normal vehicle wheel having a low abnormality occurrence risk or interrupting the supply of the pressurization brake liquid pressure.

* * * * *